United States Patent Office 3,564,406
Patented Feb. 16, 1971

3,564,406
MEASURING AND CONVERSION SYSTEM
Robert M. Henderson, Williams Bay, and Joseph G. Green and Richard Zechlin, Beloit, Wis., assignors to Fairbanks Morse Inc., New York, N.Y., a corporation of Delaware
Filed Sept. 22, 1967, Ser. No. 669,913
Int. Cl. G01r *17/06, 19/26*
U.S. Cl. 324—99          15 Claims

ABSTRACT OF THE DISCLOSURE

The measuring system of this invention includes a plurality of measuring stations, each of which utilizes a novel digital sensing unit. The sensing unit includes a transducer to convert an unknown factor to be measured into an electrical analog voltage and a novel conversion system which employs a voltage comparator unit capable of performing plural separate comparisons in a start pulse comparator and a stop pulse comparator. The start pulse comparator operates at a first coincidence point determined by the algebraic sum of a positive ramp signal, a negative bias signal, and the unknown analog signal to initiate a pulse counting period, while a stop pulse comparator initiates a stop pulse to end the counting period upon coincidence between a second negative bias and the ramp signal. Digital pulses created during the counting period are then sent to a counting unit. These digital pulses may result from a number of separate sensing units, from a single sensing unit, or from a sensing unit formed by a number of separate transducers connected to a single conversion system. If desirable, the system may be employed directly without transducers as an analog voltage measuring and conversion unit.

BACKGROUND OF THE INVENTION

The measuring and conversion system of the present invention incorporates a novel voltage measuring and conversion unit which, due to a modified voltage ramp measuring principle of operation achieves voltage conversion rapidly and accurately. The power supply requirements of the voltage measuring and conversion unit are such as to make battery operation for commercial use economically practical, and the unit has been designed to use a minimum number of parts so that it can be assembled as an integral part of a packaged digital output transducer. Such an integral transducer unit eliminates the necessity of correcting for the distances normally involved in a multiple transducer measuring system between the transducers and the measuring and conversion circuit which receives the analog output therefrom.

The low power requirements of the measuring and conversion unit permit the use of micrologic circuit components and large scale integrated circuits are feasible. The circuit may be placed on a printed circuit card or one or more silicon chips forming an integrated circuit package. The circuit may be directly combined in an integral package with a pressure, temperature or other suitable transducer or sensing unit to form a digital sensing cell whose output pulses directly correspond to an applied function to be measured. The circuit may also be directly employed without a transducer as a voltage measuring and conversion circuit.

To meet the demand for an accurate measuring and conversion system having a rapid response, voltage measuring and conversion units including analog to digital conversion systems employing a ramp voltage principle have been used to some advantage. In these systems, a locally generated ramp voltage having a constant voltage rise per time is compared to the unknown analog input voltage while simultaneously, a digital indication is produced upon a counter by pulses from a stable oscillator. When the ramp voltage rises to a value equal to the input analog voltage, the counter is caused to discontinue counting the pulses furnished from the oscillator and the time required by the ramp voltage to reach the magnitude of the unknown analog voltage is determined by the number of pulses received by the pulse counter. The digital count completed by the counter is indicative of the amplitude of the unknown analog signal.

In such prior measuring and conversion systems utilizing the ramp principle, it was found that in attempting to obtain accurate sensing of coincidence between the input analog signal and the locally generated ramp voltage, various inherent problems occur. For example, in these systems, the counter units were activated at the instant the ramp voltage rise was instituted, and the function of comparing the unknown analog voltage to the ramp voltage was initiated at the instant of zero ramp voltage time. However, the stop pulse terminating the operation of the counters was instituted at a later time when the ramp voltage and the unknown analog voltage were equal in amplitude, and, if at the instant the ramp voltage was initiated the amplitude of the unknown analog voltage was exactly equal to or less than the ramp voltage amplitude, no later stop pulse could be initiated since no second zero crossing would occur. Therefore, a runaway counter condition was forthcoming.

To rectify this runaway counter problem and also to eliminate the small non-linearities which often occur in the initial portion of the ramp voltage curve, improved measuring and conversion systems employing a novel ramp voltage comparator having dual comparator units for separately generating the start and stop pulses for controlling counter operation have been developed. Such a system is illustrated in U.S. Pat. 3,258,764, to R. Ortiz-Muniz and J. G. Green, issued June 28, 1966.

Although improved measuring circuits employing dual comparator systems which incorporate the advantages of high speed operation provided by operational amplifiers and similar improved electronic components have been developed to enhance the accuracy and increase the response time of analog voltage measuring units, these circuits still suffer from certain inherent disadvantages.

A first disadvantage of these previously improved analog to digital conversion systems utilizing the ramp technique in measuring applications is that a comparison between the ramp and unknown analog voltage occurs throughout the time base period when oscillator pulses are being counted. Thus, variations occurring in the analog voltage during this period could have a definite effect upon the accuracy of the output count obtained.

A second disadvantage of these previously improved analog to digital conversion systems is that the comparison time during which pulses are counted is normally equal to the time which it takes for the ramp voltage to reach the amplitude of the unknown analog input voltage, and although this time is normally of extremely short duration, it can still be excessive for many measuring applications. For example, the rapid passage of successive loads over a weighing platform often causes low frequency vibrations of the platform which are then transmitted to a load cell or similar load responsive unit. The electrical output of this unit varies above and below its true value in accordance with the platform vibration frequency, and thereby induces an error in the analog voltage fed to the measuring and conversion system. To minimize or eliminate the errors occasioned by this vibration frequency, it has been accepted practice to cause the force measuring circuit to integrate or to average the load signal obtained over a specified period of time. In averaging circuits, the number of individual measurements taken of a single load is limited by the response time of the measuring circuit, and this response time is longer if each measuring cycle must extend for the total period required for the ramp voltage to rise to the level of the unknown analog voltage.

In carrying out many measuring applications, it would be extremely advantageous to employ a plurality of digital load sensing units which would simultaneously provide an output count directly to a centralized counter system so that a total count indicative of the distribution of an unknown factor present at a number of locations could be obtained, or, in the alternative, such individual sensing units could provide separate counts to individual counters which would indicate the value of an unknown factor present at a specific point. When separate counts are to be provided, the sensing units could be connected to provide cyclic operation wherein the stop pulse or signal for one unit operates as a start signal to trigger the operation of a subsequent unit. With prior measuring systems, it has been impossible to achieve an operation of this nature, due to the bulk and complexity of the conversion systems employed. The large number of complex circuit components utilized within these systems with the corresponding high supply voltage requirement occasioned by such components has rendered the systems unsuitable for use in a compact, digital sensor, which often must operate with a minimum supply voltage.

It is the primary object of this invention to provide a measuring system and method capable of providing a rapid and accurate voltage measuring function.

Another object of this invention is to provide an improved measuring and conversion unit for measuring applications which is capable of performing a rapid voltage conversion function.

A further object of this invention is to provide a novel, compact digital sensing unit which forms a unitary measuring and conversion system capable of performing a rapid sensing and conversion function.

Another object of this invention is to provide a novel and improved measuring system employing a plurality of measuring stations, each of which produces a digital output signal which is a function of the unknown factor to be measured which is present at such station.

Another object of this invention is to provide a novel unitary digital sensing and conversion unit in which all circuit components are maintained at the same ambient temperature and may be uniformly temperature compensated.

A further object of this invention is to provide a novel and improved measuring and conversion system which automatically recycles at the termination of each measuring function so as to be immediately prepared to initiate a subsequent measurement.

Another object of this invention is to provide a novel and improved measuring system including a plurality of individual measuring stations, each providing a digital output which is a function of the unknown factor to be measured which is present at each station to a single counter system.

A further object of this invention is to provide a novel and improved sensing unit incorporating a measuring and conversion system of compact size capable of operating accurately with a minimum supply voltage.

Another object of this invention is to provide an improved measuring conversion system operating upon a modified ramp voltage principle wherein a rapid digital output indication of an analog input may be obtained.

A further object of this invention is to provide an improved measuring and conversion system which incorporates a novel ramp voltage comparator system wherein the measuring function is not initiated at the instant the ramp voltage is begun to compensate for initial non-linearities in the ramp voltage.

Another object of this invention is to provide an improved measuring and conversion system which includes a novel voltage comparator employing separate start pulse and stop pulse comparison units.

A further object of this invention is to provide a novel and improved measuring and conversion system which includes a start pulse comparator for providing a start pulse at a coincidence point determined by the aglebraic sum of a ramp, bias, and the analog signal to start a pulse generator network, and a stop pulse comparator operating a coincidence point determined by a bias and the ramp signal to provide a stop pulse to stop the pulse generator.

Another object of this invention is to provide a novel and improved measuring and conversion system operating on a modified ramp voltage principle wherein a digital output indicative of the amplitude of an unknown analog input is produced and counted during a time period during which the effect of changes in the unknown analog input voltage upon the count is minimized.

A further object of this invention is to provide an improved measuring and conversion system which may be advantageously incorporated for use with various computer, measuring or indicating applications to provide an accurate and rapid voltage measuring and conversion function.

Another object of this invention is to provide a novel and improved measuring system including a plurality of sensing and measuring stations connected to provide cyclic operation wherein sequential outputs are obtained from each such station.

A still further object of this invention is to provide a novel and improved measuring system including a plurality of sensing units operative to provide a digital output so that distances between such units and a counter does not affect the system accuracy.

The above and further objects and details of this invention will be readily apparent upon a consideration of the following specification taken with the accompanying drawings in which.

The primary component of the measuring system of the present invention consists of a sensing and conversion unit which operates to convert a sensed unknown factor into an electrical analog input signal and then subsequently converts the analog signal into a digital output signal. It is this sensing and conversion unit which is capable of providing a very rapid digital output indicative of an applied factor to be measured.

Figure 1:
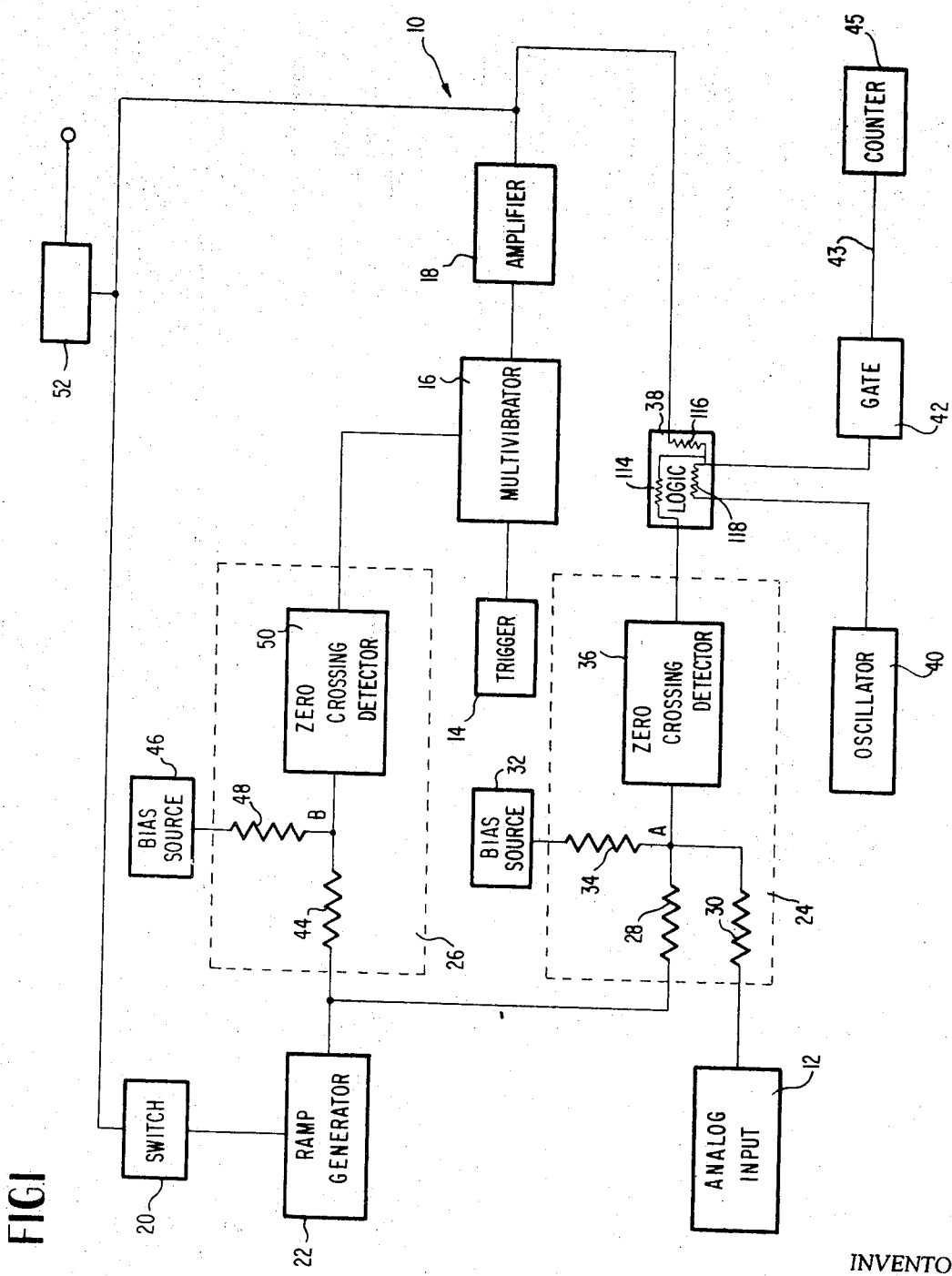
FIG. 1 is a block diagram of the sensing and conversion unit for the measuring and conversion system of the present invention.

Referring to FIG. 1, the sensing and conversion unit of the present invention indicated generally at 10 includes a sensor 12 for converting an applied force into an electrical analog input signal. The sensor 12 may constitute any of a number of conventional load cell devices or similar transducer devices for converting an applied unknown factor such as temperature, force, etc., to an electrical signal. The sensor may be eliminated when the unit 10 is employed for direct voltage measurements.

To initiate the controlled operation of the sensing and conversion unit 10 so that the input from the sensor 12 may be measured at a desired time, a trigger unit 14 provides a start to measure signal in the form of a trigger pulse. This trigger unit may consist of any conventional circuit capable of producing a trigger pulse upon the happening of a desired event. For example, the trigger pulse could be provided by a load responsive switch on a weigh platform, or, in some instances, it might be desirable to employ a sampling circuit which produces timed, recurring trigger pulses.

The output pulse from the trigger unit 14 is fed to a bistable multivibrator 16 and operates to switch the multivibrator from a quiescent to an active state. In the active state, the multivibrator provides a control potential to an amplifier 18 which is then activated to initiate the operation of a switch circuit 20. Switch circuit 20 causes a ramp generator 22 to provide a substantially linearly increasing ramp voltage to a first comparison circuit 24 and a second comparison circuit 26.

As the linearly increasing ramp voltage from the ramp generator 22 develops across a resistor 28 in the first comparison circuit 24, the analog voltage from the analog input 12 is developed across a resistor 30. The resulting currents are combined at a summing point A along with a negative bias current which is provided by a bias source 32 through the resistor 34. The algebraic sum of the positive going ramp and analog currents and the negative bias current at the summing point A is applied to a zero crossing detector 36, and when the algebraic sum of these currents reaches zero because of the linearly changing ramp, the zero crossing detector output shifts rapidly to provide a start signal through a portion of a logic circuit 38 to a gate 42. Upon receiving the start signal, the gate passes constant frequency pulses from a stable oscillator 40 to the output 43 of the sensing and conversion unit 10. These output pulses may be fed to an external counter 45 which registers the digital count received from the output and then subsequently supplies such count to a suitable indicator device.

As the linear ramp voltage is increasing across the resistor 28, the ramp generator 22 is also developing current through a resistor 44 in the comparison circuit 26. The current from the resistor 44 is algebraically compared at a summing point B with a negative bias current provided by a bias voltage source 46 through a resistor 48. The summing point B constitutes an input summing point for a zero crossing detector 50, and when the algebraic sum of the currents at this summing point reaches zero, the output potential from the zero crossing detector changes rapidly in polarity from a negative to a positive value. This rapid change in the output potential from the zero crossing detector 50 is felt by the multivibrator 16, and the multivibrator is thereby caused to change from its active state back into its initial quiescent state. This results in a number of simultaneous occurrences throughout the circuit; namely, the amplifier 18 and switch 20 operate to terminate the action of the ramp generator 22 so that the reference voltage input to the comparison circuits 24 and 26 drops to zero, causing both zero crossing detectors 36 and 50 to return to their initial state. Simultaneously, the logic circuit 38 causes the gate 42 to block pulses from the oscillator 40, while an output signal will be present at an end cycle output 52 to indicate that the measuring function of the sensing and conversion unit 10 is completed.

Essentially, the comparison which occurs in the comparison circuit 24 is one between the input analog signal from the analog input 12 with the output of the ramp generator 22, but since the signals from these two sources are aiding each other, it is the bias current from the bias source 32 through the resistor 34 which establishes the zero crossing point for the zero crossing detector 36. It is important to note that the first comparison, namely the comparison in the comparison circuit 24, is the one that establishes the value of the input analog signal, and in this, the present circuit differs from conversion circuits employing conventional ramp-reference signal techniques. Conventional ramp reference systems use a first comparison to establish a deadload zero point at which a start count pulse is initiated, and in these systems, the measurement of the input analog signal occurs at a second comparison point after this deadload zero point is established. Therefore, variations in the input analog signal after this first point could affect the measurement achieved.

In the present system, after the first comparison is made, the measurement of the analog voltage is essentially taken. It is the first comparison which establishes the unknown voltage measurement, unlike the operation of conventional ramp systems, and thus the present system makes comparisons in a manner which is new and novel to ramp measurements.

Also in conventional ramp systems, fluctuations in the input analog voltage during the comparison period after the start of a pulse generator seriously affect the accuracy of the measurement obtained. In the present system, the effect of such fluctuations is minimized and the system is not as sensitive to analog voltage changes as are conventional ramp systems. For example, upward or positive fluctuations of the analog voltage do not affect the digital count while downward or negative fluctuations do not affect the count when the ramp is of a high value. Should the analog voltage drop to a zero value or a low value when the ramp is low, the system will be cut off due to the current drop at summing point A, but with a subsequent rise in the analog voltage, the system will come back on at substantially the first coincidence or zero crossing point. Thus the present ramp system has an averaging effect when negative analog voltage fluctuations occur and is more accurate under full load than are conventional ramp systems.

The effects of analog fluctuations may be completely eliminated and the analog voltage effectively isolated from the measuring and conversion system after the first zero crossing occurs at summing point A by adding a separate voltage source to the analog input circuit. This separate voltage source would provide sufficient positive current at summing point A after zero crossing occurs to maintain the state of the zero crossing detector 36 even if the analog input voltage drops to a zero value. This voltage source could constitute a capacitor circuit which charges as the analog voltage rises and discharges with a drop in analog voltage to temporarily maintain the current level at summing point A.

Figure 2:
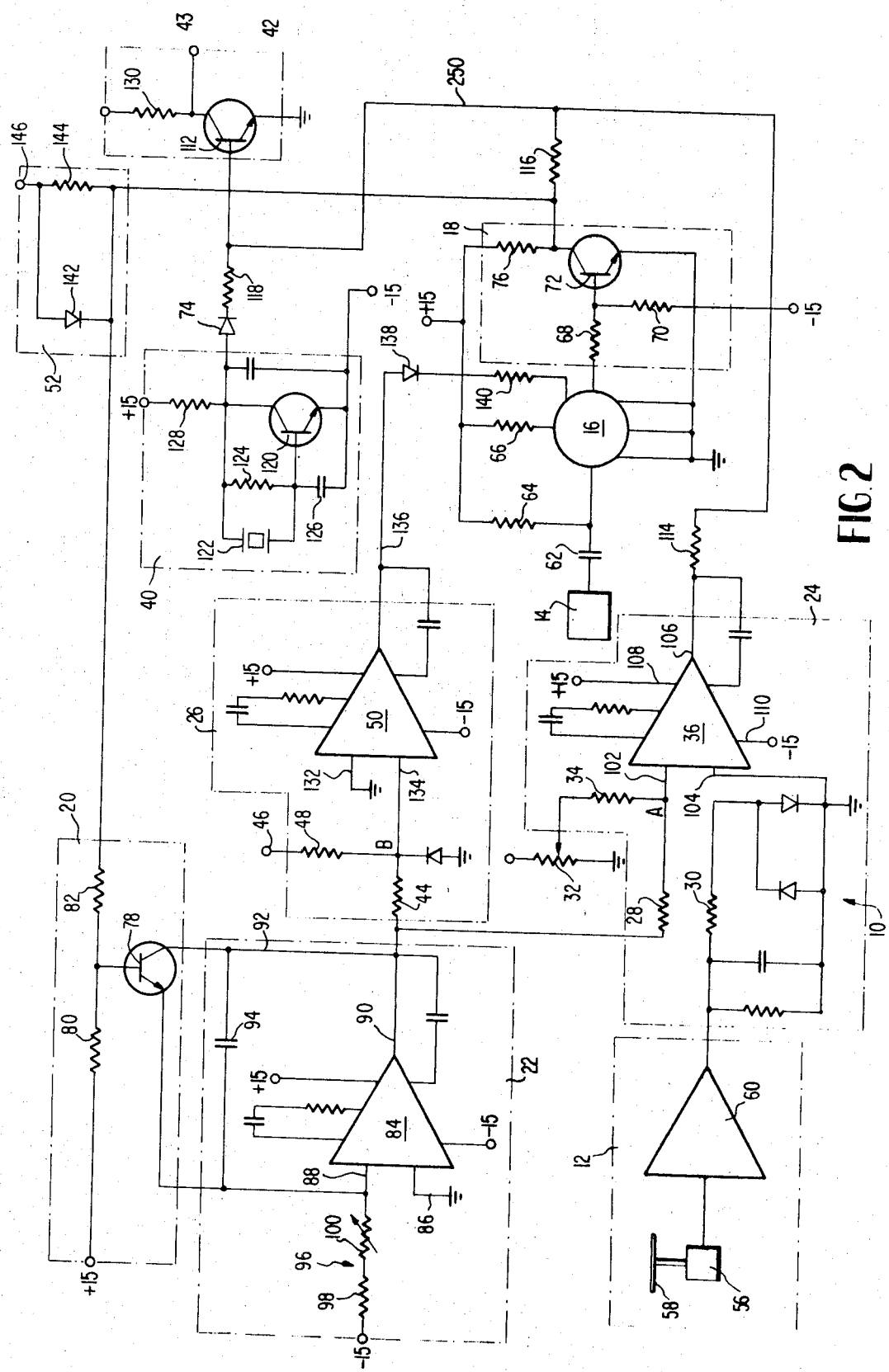
FIG. 2 is a schematic diagram of the sensing and conversion unit of FIG. 1.

Referring now to FIG. 2, the circuit detail of the sensing and conversion circuit 10 of FIG. 1 will be noted. This circuit is designed to sense and convert an analog input signal which is developed in the analog input unit 12. As previously indicated, the analog input could include any one of a number of sensing or transducer units for producing an analog input signal to be converted, but for purposes of illustration in FIG. 2, this analog input unit includes a load cell 56 which may be operatively connected to a load platform 58 so that the load cell provides an output analog signal which is representative of a load applied to the load platform. This analog signal may then be amplified by an amplifier 60, which is a conventional amplifier functioning to accept the load cell output voltage and to amplify this voltage to a value compatible with other circuit parameters. In some instances, the analog voltage to be converted may be of such a magnitude that the amplifier 60 is not required in the analog input unit 12. In fact, in cases where the input analog signal is of too great a magnitude for the remainder of the sensing and conversion system, the amplifier 60 might be replaced by a voltage step down unit to adjust the amplitude of the analog signal to a value compatible with the remainder of the circuit.

With a positive voltage potential present at the analog input of the sensing and conversion unit 10, the unit is ready for operation. This operation is initiated by a trigger signal provided by the trigger unit 14, and as previously indicated, this trigger unit may be formed by any well known unit for providing a trigger pulse to initiate operation of the sensing and conversion unit at a desired time, such as a switch on the load platform 58.

A trigger signal from the trigger unit 14 in the nature of a negative going pulse is applied across an input capacitor 62 to the input of the bistable multivibrator 16. Positive potential for the multivibrator is provided across resistors 64 and 66, and in its quiescent state, the multivibrator has a low output voltage level. However, upon the reception of the negative going trigger pulse, the multivibrator is driven into its active state and the output voltage across the resistor 68 rises rapidly from a low voltage to a high voltage level.

The resistors 68 and 70 are connected between the output of multivibrator 16 and a negative voltage supply which is impressed on the base of NPN transistor 72 by means of resistor 70. Resistor 68 in combination with resistor 70 forms a voltage divider for controlling the base potential for transistor 72 and, when the multivibrator 16 is in its quiescent state, the voltage at a point between the resistors is at a level sufficiently low to maintain transistor 72 in its non-conducting state. However, when the output potential from the multivibrator rises to a higher value as the multivibrator shifts to its active state, the voltage at the base of the transistor 72 reaches a level sufficient to drive the transistor into conduction. With the current flow now established through the transistor 72, the output voltage at the collector output of the transistor, which was previously a high voltage value when measured between the collector and emitter of the transistor, now drops to an extremely low voltage value. This drop in the output voltage from the amplifier 18 operates to activate the switch unit 20.

Switch unit 20 includes an NPN transistor 78, which in its quiescent state is normally conducting. This is due to the fact that the emitter of transistor 78 is at ground potential by virtue of the fact that a second input 88 for an operational amplifier 84 is essentially at ground, while the base circuit of the transistor is controlled by a voltage divider consisting of resistors 80 and 82 connected to the output of the transistor 72 in the amplifier 18. Resistor 80 of the voltage divider is connected to a negative voltage point, and thus, with the transistor 72 non-conducting, the high output voltage from the collector of the transistor 72 is connected by the voltage divider 80 and 82 to the base of the transistor 78, and the resultant positive voltage at the base of the transistor renders the transistor conductive. Conversely, when the transistor 72 is driven into conduction, the voltage at the base of the transistor 78 between the voltage divider resistors 80 and 82 drops to a point sufficient to drive the transistor 78 into its non-conducting or cut-off state.

The ramp generator 22, which is connected to be operated under the control of the switch 20, constitutes a conventional operational amplifier 84 connected across the emitter-collector circuit of the transistor 78. Amplifier 84 is connected to a ground reference input circuit 86 and includes a second input 88 which is maintained by the internal functioning of the operational amplifier at the reference level established at the input circuit 86; namely, ground. Additionally, amplifier 84 includes an output circuit 90 and a feed back circuit 92 including a capacitor 94 which extends between the output 90 and the input 88. The capacitor 94, with a resistive network 96 acts to cause the amplifier 84 to operate as a time integrator-inverter. The resistive network includes resistors 98 and 100 which are connected to a negative input voltage source.

In the operation of the ramp generator 22, when the transistor 78 is conducting the flow of current across the transistor prevents a charge from being developed on the capacitor 94. However, when reduced potential from the output of the transistor 72 at the base of the transistor 78 causes this transistor to cut-off and cease conduction, the capacitor 94 begins to take on a charge across the path provided by the resistors 98 and 100. This charging of the capacitor 94 produces an output potential at the output 90 of the amplifier 84 which is a positively increasing voltage having a rate of increase which is essentially linear. This positively increasing linear ramp voltage is time related in that the magnitude of the voltage at any instant is a function of the time elapsed from the start of the ramp.

The linearly increasing ramp voltage from the operational amplifier 84 is simultaneously impressed upon the inputs of the comparison circuits 24 and 26 by means of the input resistors 28 and 44. The functional characteristics of the comparison circuit 24 will be first described because the response action of this comparison circuit occurs first in the measuring cycle accomplished by the sensing and conversion unit 10.

The operational amplifier 36 in the comparison circuit 24 serves as a conventional voltage crossing detector and has a functional characteritic which is such that if the current at a first input 102 of the amplifier is less than that at a second input 104, the output voltage of the amplifier at an output 106 will be a high positive voltage. However, when the current into the first input 102 equals or becomes higher than the current into the input 104, then the output voltage will be a high negative voltage. Thus, it will become apparent that if the current into the first input 102 is initially less than that into input 104 and then increases to a value greater than that into input 104 the result will be as follows. The instant that this input current exceeds the value of the current at input 104 in a positive direction the output at 106 will very rapidly switch from a positive to a negative value. Hence, the amplifier 36 operates as a conventional zero crossing detector.

As has been previously described, the value of the current level at the input 102 of the operational amplifier 32 is the resultant of the three currents present at the summing point A. Thus, at the beginning of a measuring cycle, the input analog current developed through the resistor 30 by the analog voltage opposes at the summing point A the bias current through the resistor 34 from the potentiometer and negative voltage source forming the bias source 32. Thus, the analog input current is a substantially fixed, but unknown positive current while the bias current is a fixed, known negative current. It is then only necessary to have the ramp voltage across the resistor 28 increase to a positive value such that the algebraic sum of the currents at the summing point A is equal to zero. At this point, the output of the operational amplifier 36 will go through a reversal of voltage and rapidly shift from a positive to a negative voltage potential. It is important to note that if the positive value of the unknown analog voltage is high, a lower ramp voltage is needed to achieve zero crossing detection, while the opposite is true if the value of the analog input voltage is low.

The output potential from the operational amplifier 36 controls the operation of a transistor 112 through a logic circuit formed by resistors 114, 116, and 118 in combination with the transistor. To understand the operation of the transistor 112, it will first be noted that the base of the transistor is continuously provided with stable pulses of constant frequency from the oscillator 40. This oscillator is a conventional crystal oscillator formed by a transistor 120 having a crystal 122 provided in the base circuit thereof and a series R.C. base circuit formed by a resistor 124 and a capacitor 126. The collector of the transistor 120 is connected to a positive voltage supply source by a resistor 128.

The resistor 118 is connected to the base of the transistor 112 and to the collector circuit of the transistor 120 by a diode 74, while the resistor 116 is connected between the base of the transistor 112 and the collector of the transistor 72. The resistor 114 is connected between the base of the transistor 112 and the output of the operational amplifier 36.

The emitter of the transistor 112 is directly connected to ground while the collector of the transistor is connected through a resistor 130 to a source of positive potential. The output of the transistor is taken from the collector thereof and may be fed to an external pulse counter.

The transistor 112 is responsive to the base voltages developed across the resistors 114, 116, and 118, and several voltage level conditions control the action of the transistor. For example, with the pulse voltage across the resistor 118 at a high positive voltage point, the collector voltage from the transistor 72 across the resistor 116 at a high positive voltage point, and the amplifier output voltage across the resistor 114 at a high positive voltage point, the transistor 112 is driven far into saturation and the output of the transistor is substantially zero. This is also true when the pulse voltage across the resistor 118 is at a low negative voltage point but the voltage across the resistor 114 or 116 is at a high positive voltage point. Thus, it may be seen that as long as the voltage across the resistors 114 or 116 is high, oscillator pulses will not appear at the collector output of the transistor 112.

When the voltages across the resistors 118 and 114 are high while the voltage across the resistor 116 is low, the transistor 112 is still in saturation and provides a zero output, but the transistor is not driven as far into saturation as when a high voltage existed across the resistor 116. This is similarly true when the voltages across the resistors 116 and 118 are at a low point but the amplifier output voltage across the resistor 114 is at a high point. Thus, it may be seen that in these conditions, the saturation level of the transistor has been reduced by lowering the voltage across the resistor 116, but not sufficiently far enough to permit oscillator pulses from the oscillator 42 to affect the output level of the transistor.

When the pulse voltage across the resistor 118 is at a high point, while the voltages across the resistors 114 and 116 are low, then the transistor 112 is driven just slightly into saturation so that the output thereof is still at zero. However, when the pulse output across the resistor 118 is at a low excursion, and the voltage outputs across the resistors 114 and 116 are similarly low, the transistor 112 is driven to cut-off and the output of the transistor will be of a high positive voltage substantially equal to the source voltage across the resistor 130. Only when all voltage levels across the resistors 114, 116, and 118 are low will an output from the transistor 112 occur. This output will constitute a pulse train which follows the frequency of the oscillator 42.

It is apparent that the resistors 114, 116, and 118 form a logic circuit which allows oscillator pulses to pass through the transistor 112 only when a zero crossing condition exists at the operational amplifier 36 and the transistor 72 is conducting as occurs with the sensing and conversion system in the operational mode as previously described. This condition is the first coincidence point in the measuring cycle accomplished by the sensing and conversion system 10, and occurs when the resultant current from the ramp voltage, the bias voltage, and the unknown voltage at summing point A reaches zero. At this point, oscillator pulses are permitted to pass through the transistor 112 and the counting function in the measuring cycle begins.

The signal to terminate the pulse output from the transistor 112 is provided by the second comparison circuit 26. Like the first comparison circuit 24, the second comparison circuit includes a zero crossing detector 50 formed by an operational amplifier, and the construction and operation of this zero crossing detector is substantially the same as that of the zero crossing detector 36. However, the zero crossing detector 50 responds to the currents at a summing point B where only two currents are developed; namely, from the linearly increasing ramp voltage through the resistor 44 and the negative bias current from the bias source developed through the resistor 48. Additionally, it will be noted that a first input 132 to the operational amplifier is grounded while a second input 134 is connected to the summing point B. Therefore, unlike the operational amplifier 36, the operational amplifier 50 will normally provide a negative voltage level at an output 136, while, at a zero crossing point between the ramp and the bias currents it will rapidly swing to a positive voltage output.

Ideally, the negative bias level at the summing point B is chosen so that at zero unknown analog voltage input, the ramp current applied to both operational amplifiers 36 and 50 will cause the zero crossing at the summing points A and B to occur at precisely the same point in time. This is not essential, however, and the sensing and conversion system 10 will operate as long as a set bias current differential is maintained between the bias currents at summing points A and B.

When the ramp voltage has risen to a positive level resulting in zero crossing between the currents of summing point B, the output from the operational amplifier 50 will swing from a negative to a positive voltage which is then applied through a diode 138 and across a resistor 140 to the multivibrator 16. This positive potential constitutes a reset potential for the multivibrator which initiates a simultaneous chain of events. Upon receipt of the reset potential, the multivibrator 16 switches back to its normal or quiescent state, with the output across the resistor 68 returning to a low voltage value. The resultant shift to a low voltage at the base of the transistor 72 causes the transistor to be driven to cut-off, thereby causing a voltage increase at the collector output of the transistor. This voltage increase is developed across the resistor 82 at the base of the transistor 78 and drives the transistor into conduction. Conduction of the transistor 78, as previously explained, prevents the accumulation of a charge on the capacitor 94 and the ramp voltage at the output 90 of the operational amplifier 84 drops to zero, thereby terminating the operation of the ramp generator 22. The removal of the ramp voltage causes both operational amplifiers 36 and 50 to return to their normal or quiescent state in preparation for a subsequent measuring cycle.

Also, when the output at the collector of the transistor 72 increases to a high positive voltage, the voltage increase is impressed upon the resistor 116 and drives the transistor 112 into saturation, thereby terminating the pulse train which previously appeared at the output of the transistor. At the same time, the positive voltage change at the collector output of the transistor 72 is developed across a resistor 144 in the end cycle output circuit 52, which is formed by the resistor, a diode 142, and an output terminal 146. This positive rise in potential at the output 146 can be employed as a triggering pulse for a subsequent stage in a measuring circuit which may be formed by a sensing and conversion unit identical to the unit 10 as herein described. This use of the end cycle output pulse from the output 146 will be subsequently treated in greater detail.

Figure 3:
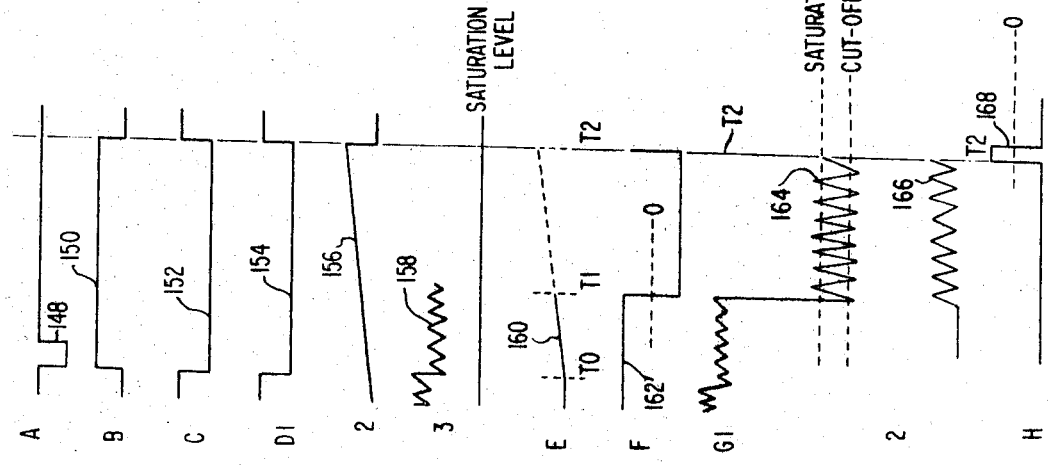
FIG. 3 is a composite diagram of wave forms appearing at various points in the sensing and conversion unit of FIG. 2.

The operation of the sensing and conversion unit 10 of FIGS. 1 and 2 may best be summarized with reference to the wave forms illustrated in FIG. 3 in combination with FIG. 2. The measuring cycle of the sensing and conversion system is initiated by a negative going trigger pulse 148 which causes the multivibrator 16 to change state. When the multivibrator changes state, the output thereof rises in voltage as does the base voltage at the transistor 72 in the manner illustrated by the wave form 150. This rise in voltage at the base of the transistor 72 drives the transistor into conduction and lowers the output voltage at the collector of the transistor as indicated by the wave form 152.

With the lowering of the voltage at the collector output of the transistor 72, several events occur simultaneously. First, the voltage at the base of the transistor 78 is lowered, as indicated by the wave form 154, and the transistor is driven to cut-off. The transistor 78 operates as an open-close switch, and at cut-off it is an open switch permitting no current to flow therethrough so the capacitor 94 begins to charge. As the capacitor charges, the operational amplifier 84 provides a substantially linearly increasing positive going ramp voltage 156 at the output 90 thereof.

Also with the drop in voltage at the collector output of the transistor 72, the transistor 112, which was previously driven far into saturation, is now not so far in saturation as indicated by the wave form 158, but the oscillator pulses from the oscillator 42 do not have negative voltage excursions of sufficient amplitude to take the transistor 112 out of saturation.

If an unknown analog voltage creates a current present at the summing point A when the ramp voltage wave form 156 is initiated, then a coincidence will occur when the ramp current plus the unknown analog current and a negative bias current add algebraically to zero at a time T1 after the start of the ramp, as indicated by the wave form 160. At this first zero coincidence point, the operational amplifier 36 causes an output voltage reversal to occur at the output 106. The normal positive voltage shifts to a negative output voltage, as indicated by the rapid reversal in the voltage wave form 162. This reversal of voltage at the output of operational amplifier 36 reduces the voltage at the base of the transistor 112 in the manner illustrated by the base voltage wave form 164, and the transistor is therefore driven into cut-off. The pulses from the oscillator 40 now drive the transistor 112 on and off thereby producing output pulses at the collector output circuit of the transistor as indicated by the wave form 166.

After the time T1, the ramp voltage continues to increase in a positive direction until a second zero crossing occurs at the summing point B at a time T2. When the algebraic sum of the currents resulting from the negative bias voltage and the positive going ramp voltage at summing point B reaches zero, the operational amplifier 50 is caused to change from a negative to a positive voltage level at the output 136 as indicated by the wave form 168. This positive output resets the multivibrator 16, as illustrated by the wave form 150, and the output voltage from the multivibrator at the base of the transistor 72 drops to a low value. The transistor 72 ceases conduction, and the output voltage at the collector output thereof rises to initiate conduction of the transistor 78, terminate the operation of the ramp generator 22, and drive the transistor 112 above the saturation level. All elements of the sensing and conversion circuit 10 now revert to normal condition in readiness for a new trigger pulse which will initiate a subsequent measuring cycle.

A very important feature of the sensing and conversion unit 10 of FIGS. 1 and 2 is that the circuit parameters of the unit are such that it may readily be combined with a transducer or other sensing unit to form a unitary digital sensing cell of compact size. The circuit can be placed upon a small printed circuit card or ramp board, and may even be placed on one or more silicon chips to form an integrated circuit package. When this ramp board or integrated circuit package is combined with a load cell, for example; a given applied load to the load cell will result in a pulse count output directly corresponding to the applied load. It should be noted that the supply voltage required for this digital sensing unit are low, and in FIG. 2, the positive and negative voltage sources for this system have been indicated as 15 volt sources, although other suitable sources may be employed. However, the output pulses from the digital sensing unit should be of sufficient amplitude so as not to be adversely affected by the transmission distance to the output counters when the counters are separated from the sensing unit.

Figure 4:
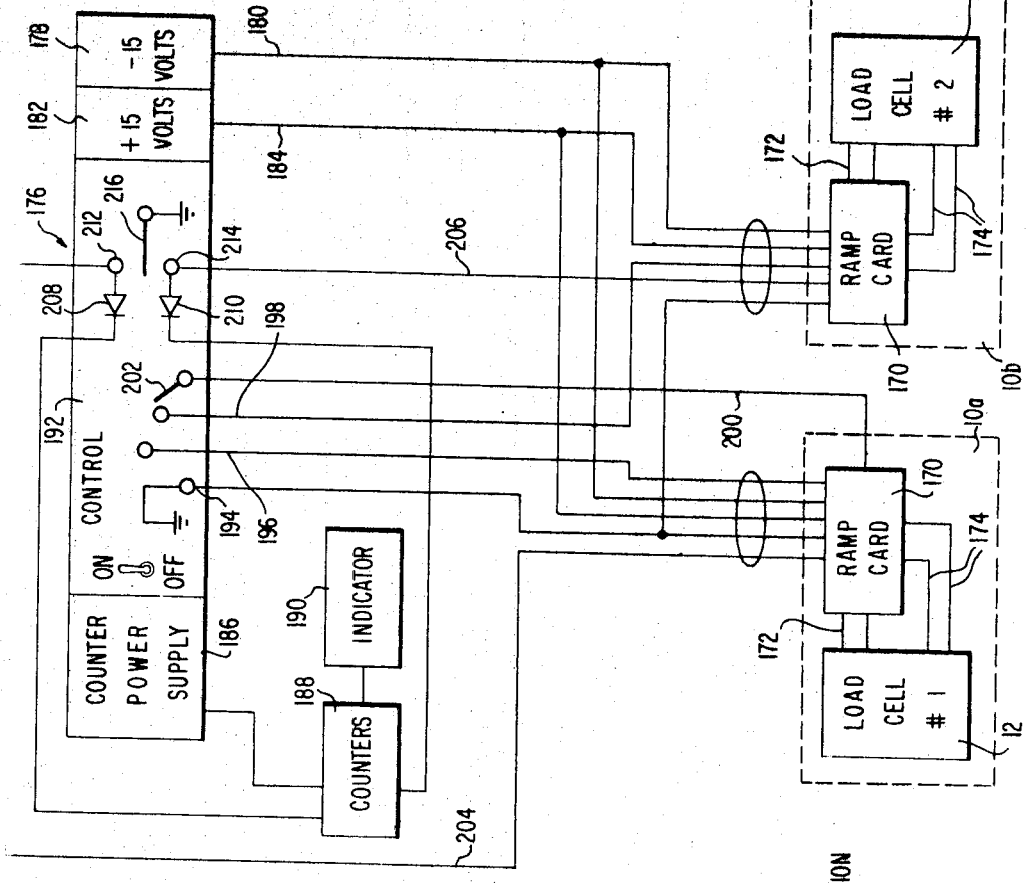
FIG. 4 is a block diagram of the measuring and conversion system of the present invention.

FIG. 4 provides a block diagram illustrative of the manner in which one or more sensing and conversion units of the type illustrated by FIGS. 1 and 2 may be connected as digital sensing stations for a measuring application. These sensing stations may sense temperature, liquid level, weight, or any unknown factor to be measured.

Referring to FIG. 4, the sensing and conversion unit 10 of FIGS. 1 and 2 is employed for illustrative purposes as digital sensing units 10a and 10b. Two sensing and conversion units have been illustrated, but any desired number of units may be employed to meet the requirements of a particular measuring application.

Each of the digital sensing units 10a and 10b includes a transducer, load cell, or other sensing device which senses an unknown factor and provides the analog input unit 12 for the unit and a ramp card 170 which carries the circuitry of FIG. 2. The electrical output from the sensing device is provided to the input amplifier 60 of FIG. 2 on the ramp card by means of output lines 172, while the operating voltage for the sensing device is provided by input lines 174 extending from the ramp card voltage source. The various input and output potentials and signals for the ramp card circuit previously described in connection with the circuits of FIGS. 1 and 2 are provided over connections between the ramp cards 170 and a central control panel 176.

Control panel 176 includes a negative voltage source 178 to provide negative potential over a line 180 to the ramp cards 170 and a positive voltage source 182 to provide positive potential to the ramp cards over a line 184. The control panel also includes a counter power supply unit 186 which supplies power for a counter system 188 connected to an indicator system 190.

A control section 192 of the control panel 176 provides a ground circuit 194 for the ramp cards 170 and a trigger or start to measure circuit for each individual ramp card. A trigger circuit 196 is connected to the ramp card for the digital sensing unit 10a while a second trigger circuit 198 is similarly provided for the unit 10b. The end cycle signal from the digital sensing unit 10a is fed by means of a line 200 to the control section 192, and this signal may be selectively connected to the trigger circuit 198 by a switch 202 when it becomes desirable to trigger the sensing unit 10b upon completion of a measuring cycle by the unit 10a. In other cases it may be desirable to separately trigger each digital sensing unit either simultaneously or at specific preset times by trigger pulses applied to the circuits 196 and 198.

The pulse train outputs from the digital sensing units 10a and 10b are fed by means of lines 204 and 206 through diodes 208 and 210 to the counter system 188. The diodes are connected to switch terminals 212 and 214 which, when selectively contacted by a switch arm 216, permit the output from one of the digital sensing units to be sensed.

The circuit of FIG. 4 can operate with any number of sensing and conversion units 10, and can be readily controlled so that these individual units operate in sequence, or at any predetermined time period. A trigger pulse applied over the circuit 196 causes the unit 10a to begin operation, and a subsequent or simultaneous trigger pulse over the circuit 198 initiates operation of the corresponding unit 10b. In the event the switch 202 is closed, the operation of the unit 10b will be initiated by the end cycle signal from the unit 10a.

The pulse train outputs on the lines 204 and 206 will be fed to the counter system 188, and generally the counter system would not be reset after receiving one pulse train but would operate to accumulate the total pulses from all digital sensing units in the system by sampling techniques.

The digital sensing and conversion unit is extremely versatile and may be adapted to a number of diverse applications. For example, it is possible to employ a plurality of sensing devices in combination with a single ramp card providing that the output voltages of the sensing devices are first summed to provide an input signal to the ramp card. Also a single counter may be connected to receive the outputs from a plurality of digital sensing units so that the counter and its associated output or memory means becomes a central accumulating and storage point for a multitude of measuring systems. Illustrative of some of the various measuring applications including the sensing and conversion unit of the present invention are the multiple sensing systems illustrated in FIGS. 5, 6 and 7.

Figure 5:
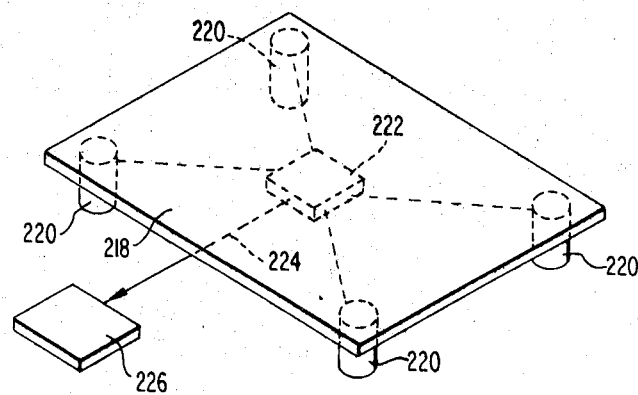
FIG. 5 illustrates an embodiment of the measuring and conversion system of the present invention wherein the sensing and conversion unit employs a plurality of sensors with a single ramp board circuit.
Figure 7:
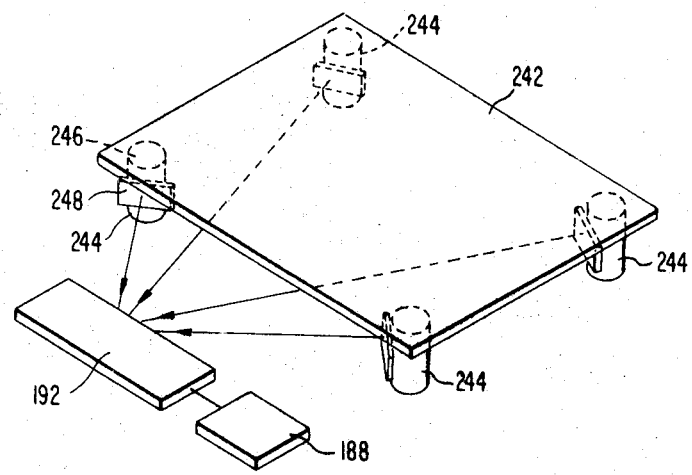
FIG. 7 illustrates an embodiment of the measuring and conversion system of the present invention wherein a plurality of sensing and conversion units feed into a counter system.
Figure 6:
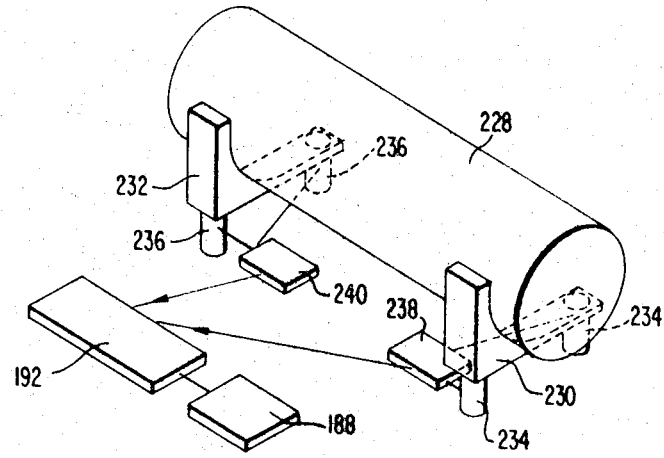
FIG. 6 illustrates an embodiment of the measuring and conversion system of the present invention wherein a plurality of ramp board circuits employing a plurality of sensors are used.

Referring first to FIG. 5, it will be noted that a weigh platform or similar force responsive member 218 associated with four force sensing load cell units 220 positioned to sense the forces at four diverse corners of the weigh platform have been utilized as the sensing device for illustrative purposes. In the description of FIGS. 5–7, force sensing load cells will be described as constituting the sensing devices for the measuring system. However, other suitable sensing devices could well be substituted for the load cells illustrated to adapt the system to perform temperature, pressure, ambient light, or other diverse measurements.

The output from each of these force sensing units 220 is electrically connected to a single ramp card 222 which carries the circuit of FIG. 2 in association with a summing network. The individual electrical outputs of the four sensing units 220 are combined in the summing network, which may constitute any suitable known summing circuit, the output of which is fed to the input amplifier 60 (FIG. 2) on the ramp card circuit to provide the input analog signal for the circuit. Thus, a digital output train indicative of the combined analog input is provided by the ramp card circuit and is fed over an output 224 to a suitable counter system 226. It is readily apparent that with the construction illustrated in FIG. 5, an output signal representing the combined forces sensed at four points on the load platform 218 is fed to the counter 226.

For some applications, such as the tank weighing unit of FIG. 6, it may be desirable to receive output signals which are indicative of the forces applied at separate and diverse points. With reference to FIG. 6, a tank 228 is mounted upon supports 230 and 232. The support 230 is designed to transmit forces to load cells 234 while the support 232 transmits forces to load cells 236. The load cells 234 are electrically connected to provide a combined analog input signal to the circuit on a ramp card 238, while the load cells 236 are electrically connected to provide an analog input to a ramp card 240. The pulse outputs from the ramp cards 238 and 240 may then be fed sequentially through the control panel 192 of FIG. 4 to the counter system 188.

By use of the control panel 192 in the manner previously explained, the force supplied at each individual end of the tank 228 can be individually measured by sampling the output of either the ramp card 238 or the ramp card 240. Also an over-all force indication for the complete tank can be obtained by sequentially receiving and indicating the outputs from both of the ramp cards.

Finally, the force measuring construction of FIG. 7 constitutes a variation of the system of FIG. 5. In FIG. 7 a load platform 242 is arranged to apply a force to four complete digital load cell units 244 positioned at the four diverse corners thereof. Each digital load cell unit includes a load cell or force sensing unit 246 and a ramp card 248. The pulse train outputs from the digital load cells are all fed in sequence to the program control panel 192 of FIG. 4 and on to the counter 188.

It will be readily apreciable that the force measuring system of FIG. 7 is quite versatile, for through the operation of the control panel 192, the output of any single digital load cell 244 can be sampled, the output of the digital load cells 244 can be sequentially sampled, or the outputs of the two digital load cells at each end of the load platform 242 can be sequentially sampled.

In systems such as those illustrated by FIGS. 4, 6 and 7 wherein a plurality of ramp cards are employed, it is often very desirable to modify the system circuit construction illustrated by FIGS. 2 and 4 to remove the oscillator 40 and gate 42 with their associated components from the ramp card and to include a single oscillator and gate circuit in the control panel which is operative for all of the ramp cards in the system. By making this alteration in a multi-ramp card system, the output signals from each ramp car may be fed sequentially into a single gate to control passage of digital pulses from a single oscillator. Any number of ramp card circuits can be accommodated by only one oscillator and one gate, thus resulting in the provision of smaller and less expensive ramp card circuits at each sensing station plus improved accuracy, since the necessity to achieve calibration between a plurality of individual oscillators is eliminated.

Figure 8:
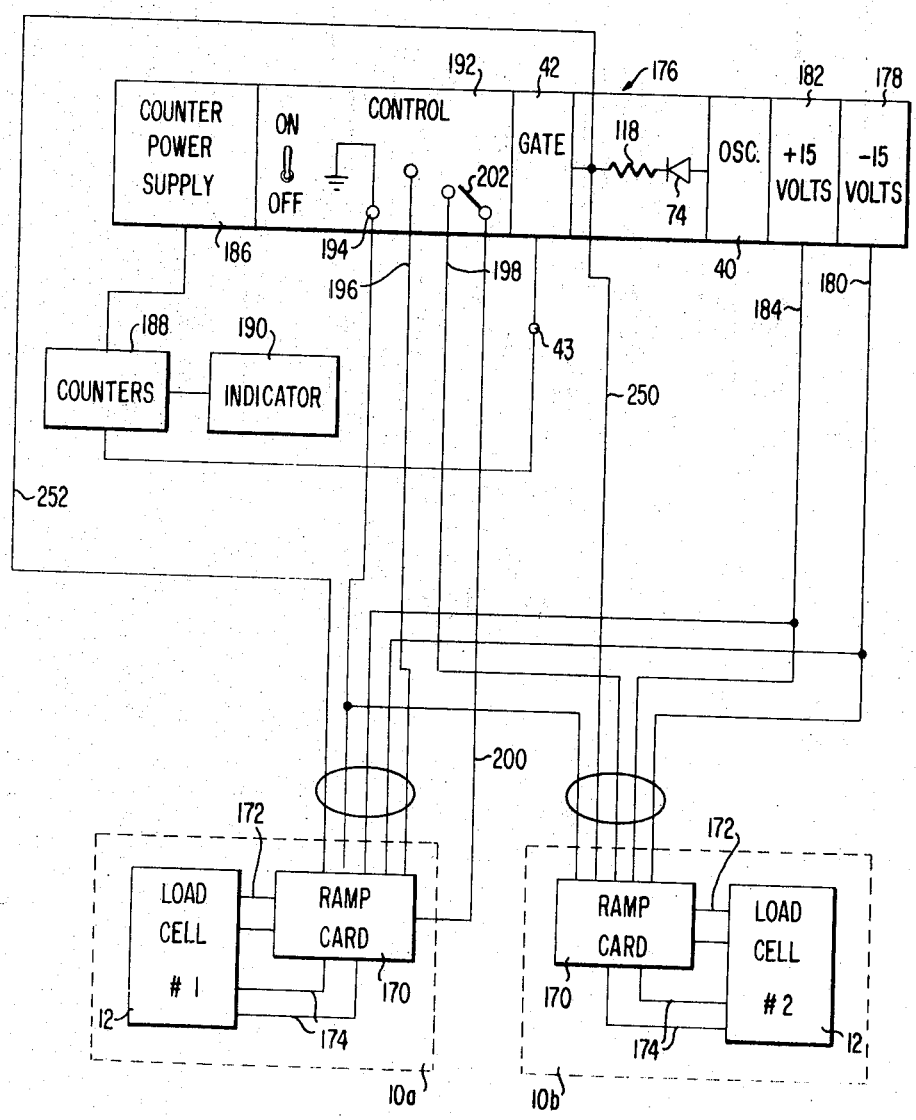
FIG. 8 is a block diagram of an embodiment of the measuring and conversion system of FIG. 4.

FIG. 8 illustrates a modification of the system of FIG. 4 wherein the central control panel 176 has been modified to include the oscillator 40 and gate 42 of FIG. 2. It will be noted, with reference to FIG. 2, that a line 250 constitutes the sole connection between the oscillator 40 with its associated diode 74 and resistor 118, the gate 42, and the remainder of the sensing and conversion system 10. Therefore, it is apparent that the system of FIG. 2 would operate in the manner previously described if the oscillator and gate were remote from the system but still connected thereto by the line 250. This has been accomplished in the modified circuit of FIG. 8 wherein the oscillator 40, the gate 42, and the associated resistor 118 and diode 74 have been removed from the ramp cards 170, and a single oscillator and gate provided in the panel 176. The ramp card circuits 170 of FIG. 8 still contain the major circuitry of the system of FIG. 2 with the exception that lines 250 and 252 now connect these ramp cards circuits to the single oscillator and gate in the panel 176. The digital outputs 204 and 206 in FIG. 4 from the ramp card circuits 170 have been eliminated in FIG. 8, for the digital output to the counter is now provided directly from the gate 42 in the panel at the output 43. Each of the various ramp cards in the system are triggered into operation at the termination of the operation of a previous ramp card, as described in connection with FIG. 4, and the operation of the system of FIG. 8 is identical to that of the system of FIG. 4 with the exception that the oscillator and gate circuits are removed from the ramp cards.

It will readily be apparent to those skilled in the art that the present invention provides a novel and improved voltage measuring and conversion system which is readily adapted to produce an accurate digital representation of an input analog voltage. For measuring applications, this invention provides a plurality of unitary digital sensing units which may form diverse measuring stations capable of providing a rapid digital output indicative of an unknown factor present in the vicinity of such stations. These digital outputs from diversely positioned stations may be controlled from a central control unit to selectively provide a plurality of accurate indications based upon individual or combined outputs from the measuring stations.

The arrangement and types of components herein may be subject to numerous modifications well within the purview of these inventors who intend only to be limited to a broad interpretation of the specification and appended claims.

What is claimed is:

1. A voltage measuring and conversion system for providing output signals in response to an analog input signal comprising reference generating means for generating an increasing reference signal, said reference signal increasing in a direction to aid said analog signal upon combination therewith, first comparison means connected to receive said analog and reference signals, second comparison means connected to receive said reference signal, and bias means connected to said first and second comparison means to provide bias signals thereto opposing said reference and analog signals, the bias signal to said first comparison means being of an amplitude sufficient to cause the algebraic sum of the signals at the input of said first comparison means to be opposite in polarity to the polarity of said analog input signal at the initiation of said reference signal by said reference generating means, said first comparison means operating to provide a first output signal when said analog and reference signals reach a coincidence point with the bias signal to said first comparison means and said second comparison means operating to provide a second output signal when said reference signal reaches a coincidence point with the bias signal to said second comparison means.

2. The voltage measuring and conversion system of claim 1 wherein said bias means operates to provide a first bias signal to said first comparison means and a second bias signal to said second comparison means, said first and second bias signals being of sufficient amplitude to cause simultaneous activation of said first and second comparison means in the absence of an input analog signal after the application of the reference signal thereto.

3. The voltage measuring and conversion system of claim 2 wherein said reference generating means operates to generate a substantially linearly increasing reference signal, said first comparison means including a first zero crossing detector means connected to receive said reference, first bias and analog signals, said first zero crossing detector means operating to compare said reference, first bias and analog signals and to provide said first output signal at a first zero crossing point when the algebraic sum of said reference, first bias and analog signals is equal to zero, and said second comparison means including a second zero crossing detector means connected to receive said reference and second bias signals, said second zero crossing detector means operating to compare said reference and second bias signals and to provide said second output signal at a second zero crossing point when the algebraic sum of said reference and second bias signals is equal to zero.

4. The voltage measuring and conversion system of claim 3 wherein said first bias signal determines said first zero crossing point, said first bias signal being of sufficient amplitude to prevent said analog signal from reaching said first zero crossing point in the absence of said reference signal.

5. A voltage measuring and conversion system for converting an analog input signal to digital signals comprising reference generating means for generating an increasing reference signal, said reference signal increasing in a direction to aid said analog signal upon combination therewith, output means for providing digital output signals, and comparator means connected to said output means and operative to start and stop said output signals, said comparator means including first comparison means connected to receive an analog and said reference signal, second comparison means connected to receive said reference signal, and bias means connected to said first and second comparison means to provide bias signals opposing said reference and analog signals, said first comparison means operating to start said output signals when said analog and reference signals reach a coincidence point with the bias signal and said second comparison means operating to stop said output signals when said reference signal reaches a coincidence point with the bias signal.

6. A voltage measuring and conversion system for measuring an unknown analog signal comprising reference generating means for generating a substantially linearly increasing reference signal, said reference signal increasing in a direction to aid said analog signal upon combination therewith, means for providing constant frequency signals, control means connected to initiate the operation of said reference generating means, bias means to provide predetermined bias signals opposite in sign to said reference and analog signals, and comparator means connected to control the flow of constant frequency signals from said constant frequency signal providing means, said comparator means including first comparison means connected to receive said reference signal from said reference generating means, a bias signal from said bias means, and said analog signal, said first comparison means operating to compare said bias, reference, and analog signals and including means to provide a start signal to initiate the flow of constant frequency signals at a first zero crossing point when the algebraic sum of said reference, analog, and bias signals is equal to zero, and second comparison means connected to receive said reference signal and a bias signal from said bias means, said second comparison means operating to compare said reference and bias signals and including means to provide a stop signal to terminate the flow of constant frequency signals at a second zero crossing point when the algebraic sum of said reference and bias signals is equal to zero.

7. The voltage measuring and conversion system of claim 5 wherein said bias means operates to provide a first bias signal to said first comparison means and a second bias signal to said second comparison means, said first and second bias signals being of sufficient amplitude to cause the simultaneous activation of said first and second comparison means in the absence of an input analog voltage after the application of the reference signal thereto.

8. The voltage measuring and conversion system of claim 5 wherein an end cycle circuit means is connected to be activated when said second comparison means operates to stop said output signals, said end cycle circuit means operating to provide an end cycle output signal.

9. The voltage measuring and conversion system of claim 6 wherein said means in said first and second comparison means to provide said stop and start signals each constitute a zero crossing detector.

10. The voltage measuring and conversion system of claim 6 wherein said control means connected to initiate the operation of said reference generating means includes trigger source means for providing a trigger signal, a two state control means for generating a first output signal in a normal state and a second output signal in an active state, said two state control means being connected to receive said trigger signal and switch to the active state upon reception thereof, whereby the output of said two state control means in said active state initiates the operation of said reference generating means.

11. The voltage measuring and conversion system of claim 10 wherein a gating means is connected to initiate and terminate the passage of output pulses from said means for providing constant frequency signals, the operation of said gating means being controlled by combined output signals from said two state control means, first comparison means, and means for providing constant frequency signals.

12. The voltage measuring and conversion system of claim 11 wherein said gating means operates to provide constant frequency output pulses of a frequency determined by the frequency of said constant frequency signals, said gating means being operative to provide said output pulses upon receiving the output signal from said two state control means in said active state, a start signal from said first comparison means, and said constant frequency signals.

13. The voltage measuring and conversion system of claim 12 wherein said two state control means is connected to receive said stop signal from said second comparison means, said stop signal being operative to return said two state control means to the normal state.

14. The voltage measuring and conversion system of claim 6 wherein said first comparison means includes an operational amplifier having an input and an output, said operational amplifier being capable of shifting from a first to second operational state to provide a start signal at said output, a summing point connected to the input of said operational amplifier, and means connecting said summing point to receive said analog signal, said reference signal from said reference generating means, and said bias signal, and said second comparison means including an operational amplifier having an input and an output, said operational amplifier being capable of shifting from a first to a second operational state to provide a stop signal at said output, a summing point connected to the input of said operational amplifier, and means to connect said summing point to receive said reference signal from said reference signal generating means and said bias signal.

15. The voltage measuring and conversion system of claim 14 in which said reference generating means for generating a substantially linearly increasing reference signal includes an operational amplifier having an input and an output, said output being connected to said first and second comparison means, a feedback circuit including a capacitor connected between the input and output of said operational amplifier, an input circuit connected to furnish charging potential to said capacitor, and a switching unit shunting said capacitor, said switching unit being connected to said two state control means and operable thereby to selectively permit said capacitor to be charged by said input circuit to cause said operational amplifier to provide a reference signal at the output thereof.

References Cited

UNITED STATES PATENTS 3,258,764  6/1966  Ortiz-Muniz et al. ____ 340—347

RUDOLPH V. ROLINEC, Primary Examiner

E. F. KARLSEN, Assistant Examiner

U.S. Cl. X.R.

324—120; 332—9; 340—347